(12) United States Patent
Feger et al.

(10) Patent No.: US 10,766,086 B2
(45) Date of Patent: Sep. 8, 2020

(54) INJECTION-MOLDED SOLDER (IMS) TOOL ASSEMBLY AND METHOD OF USE THEREOF

(71) Applicant: International Business Machines Corporation, Armonk, NY (US)

(72) Inventors: Claudius Feger, Yorktown Heights, NY (US); Bonnie L Glick, Yorktown Heights, NY (US); Jae-woong Nah, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 300 days.

(21) Appl. No.: 15/825,654

(22) Filed: Nov. 29, 2017

(65) Prior Publication Data

US 2019/0160572 A1   May 30, 2019

(51) Int. Cl.
| | |
|---|---|
| B23K 3/06 | (2006.01) |
| B23K 3/08 | (2006.01) |
| B23K 35/00 | (2006.01) |
| B23K 1/08 | (2006.01) |
| B23K 35/30 | (2006.01) |
| C22C 38/18 | (2006.01) |
| C22C 38/00 | (2006.01) |

(52) U.S. Cl.
CPC ............ *B23K 3/0623* (2013.01); *B23K 1/085* (2013.01); *B23K 3/085* (2013.01); *B23K 35/00* (2013.01); *B23K 35/308* (2013.01); *B23K 35/3053* (2013.01); *C22C 38/00* (2013.01); *C22C 38/18* (2013.01)

(58) Field of Classification Search
None
See application file for complete search history.

(56) References Cited

U.S. PATENT DOCUMENTS

| 4,307,128 | A | * | 12/1981 | Nagano | ..................... C23C 2/32 427/601 |
|---|---|---|---|---|---|
| 5,244,143 | A | * | 9/1993 | Ference | .................... B23K 1/20 228/180.21 |
| 5,364,011 | A | * | 11/1994 | Baker | ..................... B23K 1/012 228/180.21 |
| 5,529,809 | A | * | 6/1996 | Glovan | ................. B05B 7/1613 118/317 |
| 6,945,447 | B2 | * | 9/2005 | Tran | ..................... B23K 1/0016 228/180.21 |
| 8,376,207 | B2 | | 2/2013 | Buchwalter et al. | |
| 2003/0168498 | A1 | * | 9/2003 | Suter | ..................... B23K 1/0016 228/256 |
| 2005/0263571 | A1 | * | 12/2005 | Belanger | ............... B23K 3/0623 228/256 |
| 2008/0188072 | A1 | * | 8/2008 | Johnson | .................... H01L 24/11 438/615 |
| 2014/0262113 | A1 | * | 9/2014 | Feger | ..................... B22C 9/065 164/158 |

\* cited by examiner

*Primary Examiner* — Devang R Patel
(74) *Attorney, Agent, or Firm* — Joseph Petrokaitis, Esq.; McGinn IP Law Group, PLLC

(57) ABSTRACT

An injection-molded solder (IMS) tool assembly apparatus, the apparatus including an IMS tool for dispensing a molten material via a round extrusion part to coat an inside or an outside wall of a pipe (and a chiller for providing cooling water to flow through an inside of the pipe.)

16 Claims, 3 Drawing Sheets

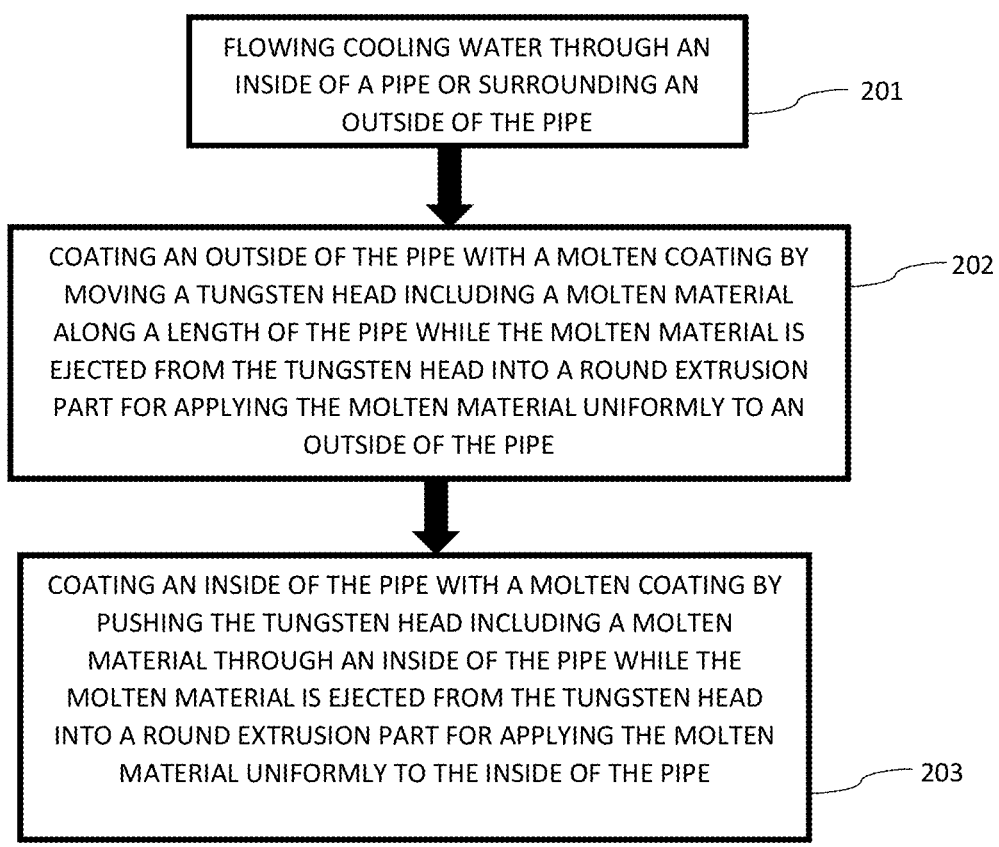

INJECTION-MOLDED SOLDER (IMS) TOOL ASSEMBLY AND METHOD OF USE THEREOF

CROSS REFERENCE TO RELATED APPLICATIONS

The present application is a related application of U.S. Pat. No. 8,376,207 B2, issued on Feb. 19, 2013, the entire contents of which is incorporated herein by reference.

BACKGROUND

The present invention relates generally to an injection-molded solder (IMS) tool assembly and a method of manufacture thereof, and more particularly, but not by way of limitation, to an apparatus that can provide a layer of liquid metal to the inner surface or to the outer surface of a steel pipe.

Carbon steel is one of the most common industrial steels used today. However, this steel rusts easily. To make it into stainless steel, a minimum of 10.5 to 11.0 wt-% chromium (or more) is added to low carbon steel. The addition of chromium makes the steel corrosion resistant. The chromium content of the steel allows the formation of a rough, adherent, invisible, corrosion-resisting chromium oxide film on the steel surface. This formation is called passivation.

Conventionally, if damaged mechanically or chemically, this chromium oxide film is self-healing, provided that oxygen, even in very small amounts, is present. The corrosion resistance and other useful properties of the steel are enhanced by increased chromium content and the addition of other elements such as molybdenum, nickel and nitrogen.

Other metals, in particular Niobium (Nb) and Titanium (Ti) have also been used to create high strength steels where strengthening effects can be obtained already at small additions of Nb. These alloying elements change the properties not by forming strong oxides but by producing specific microstructures in the steel that impart high strength and processability to the steel.

In all of these cases, the alloying metal must be added in bulk. While for instance Cr thus protects the steel throughout its thickness, it is not likely that this effect is needed beyond a certain surface layer. Moreover, prior IMS techniques (injection of molten metal on target substrate) cannot make, for example, coatings of pure Cr, Mo, Ni, Nb, or Ti layers on the surface of carbon steel because the melting temperature of the pure metals is higher than that of carbon steel.

SUMMARY

In an exemplary embodiment, the present invention provides an injection-molded solder (IMS) tool assembly apparatus, the apparatus including an IMS tool for dispensing a molten material via a round extrusion part to coat an outside or inside wall of a pipe and a chiller for providing cooling water to flow through an inside of the pipe.

The above summary will be described in more detail below with reference to the drawings. The invention is capable of embodiments in addition to those described and of being practiced and carried out in various ways. It is thus to be understood that the invention is not limited in its application to the details of construction and to the arrangements of the components set forth in the following description or illustrated in the drawings. Also, it is to be understood that the phraseology and terminology employed herein, as well as in the abstract, are for the purpose of description and should not be regarded as limiting.

As such, those skilled in the art will appreciate that the present invention may readily be utilized as a basis for the designing of other structures, methods and systems for carrying out the several purposes of the present invention. It is important, therefore, that the claims appended hereto be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which:

FIG. 2 depicts a high-level flow chart for a method of manufacture of the injection-molded solder (IMS) tool 100 according to an embodiment of the present invention.

DETAILED DESCRIPTION

Figure 1A:
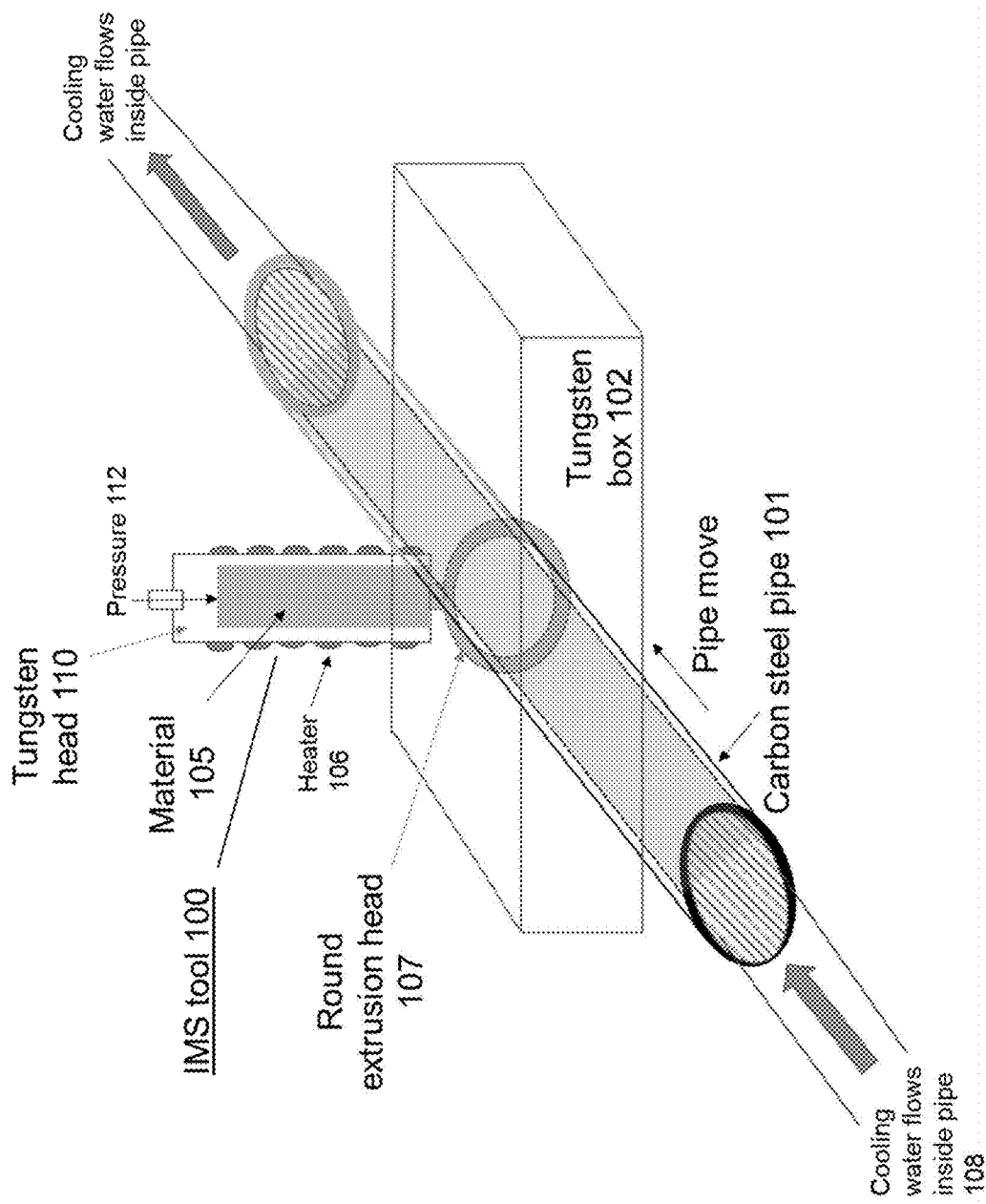
FIGS. 1A-1B exemplarily depict an injection-molded solder (IMS) tool 100 for coating an inside and an outside of a (carbon) steel pipe 101 according to an embodiment of the present invention.

The invention will now be described with reference to FIGS. 1A-2, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

Figure 1B:
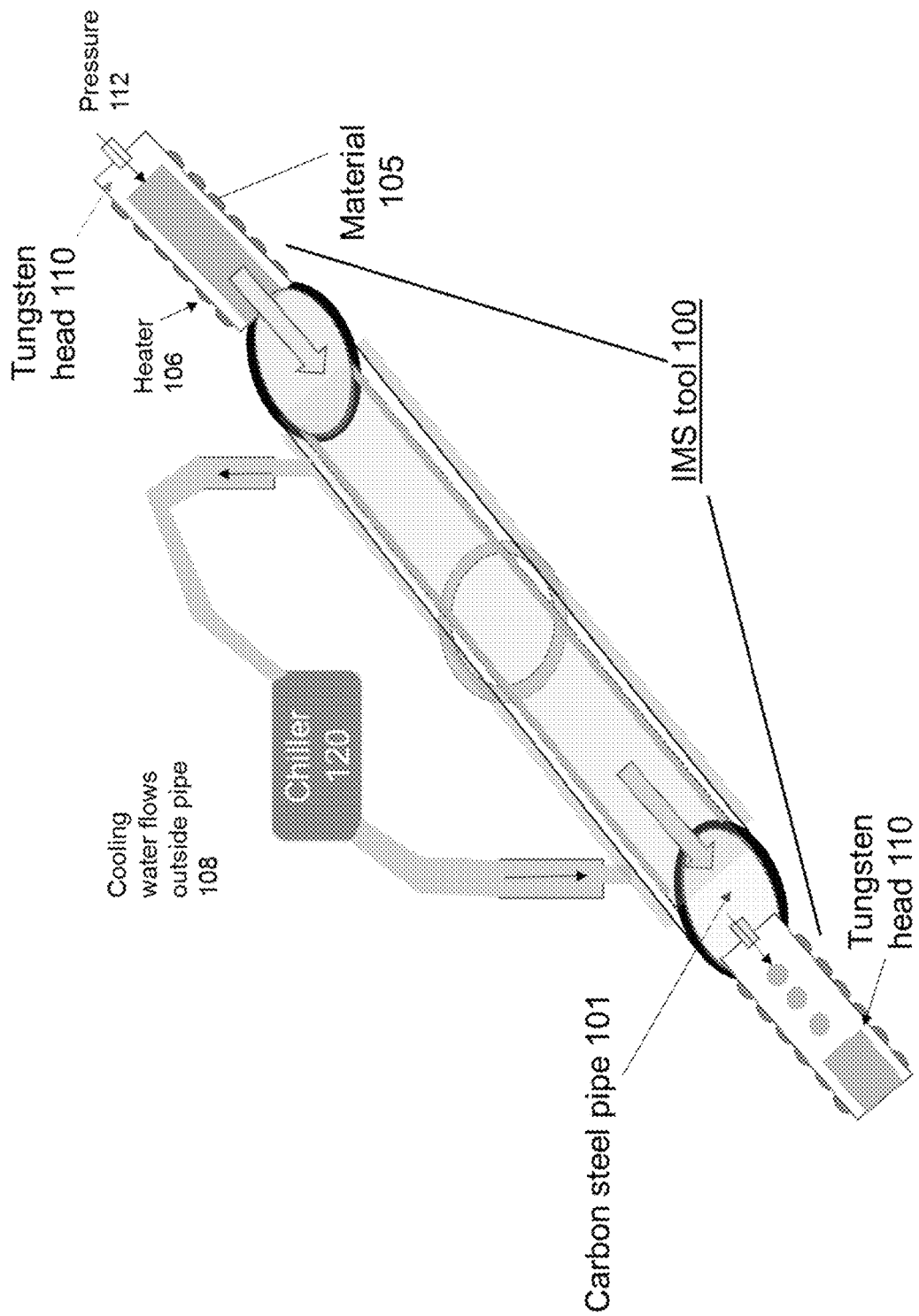

With reference now to FIGS. 1A-1B, an injection-molded solder (IMS) tool 100 is depicted that can provide a layer of liquid metal to an inner surface and/or to an outer surface of a carbon steel pipe 101. The IMS tool 110 assembly includes a heater 106, a coating material 105 including, for example, Cr, Mo, Ni, Nb, or Ti, a tungsten head 110, and a pressure applicator 112 (compressed nitrogen, etc.).

The heater 106 is disposed along the IMS tool assembly 100 to heat the alloy to material 105 prematurely solidify of the material 105. Pressure 112 can be provided by a source of pressure such as compressed nitrogen. For example, a compressor or flask may be provided to provide an overpressure with $N_2$ or another inert gas. In the tungsten head 110 is included the material 105 in a reservoir containing molten alloy, either pressurized or not. The material 105 is housed in a reservoir in the IMS tool 100 such that the pressure applicator 112 can cause the material to emit from the tungsten head 110.

As shown in FIG. 1A, the IMS tool 100 interfaces with a tungsten box 102 (i.e., a high temperature material including ceramics). The tungsten box 102 can include ceramics, Hf, Zr, Ti and Ta carbides (HfC, ZrC, TiC, TaC), Hf, Zr, Ti and Ta nitrides (HfN, ZrC, TiC, TaC), Hf, Zr, Ti and Ta brodes (HfB2, ZrB2, TiB2, TaB2). The same applies to the above mention of tungsten) of which the carbon steel pipe 101 is passed through as cooling water flows inside the pipe 108. The molten coating metal touches the outside of the carbon steel pipe 101 via a round extrusion head 107 as the carbon steel pipe 101 is drawn through the tungsten box 102. It is noted that the round extrusion head 107 for coating the pipe with the molten material is preferably sized slightly larger than an outer diameter of the pipe (i.e., 5-10% larger). For example, an 8-inch NPS pipe schedule 40 thickness has an outer diameter of 8.625 inches. Therefore, a tolerance is required between an inner diameter of the round extrusion head 107 and the outer diameter of the pipe to allow the tungsten head and the round extrusion head 107 to slide along the outer diameter of the pipe.

Coating on the surface of carbon steel pipe 101 requires cooling to avoid melting of carbon steel while the molten coating metal touches carbon steel because the melting temperature of coating material is higher than carbon steel. It is noted that the IMS tool will move rather quickly and the coating is thin compared to the thickness of the pipe. Since steel is a good thermal conductor the temperature of the steel pipe will only be raised little; a larger temperature raise would likely increase the diameter of the pipe and make control of the coating thickness more problematic. Thus, the IMS tool assembly 100 includes, for example, cooling water flowing inside the pipe as the pressure 112 causes the material 105 to emit from the tungsten head such that the metal coating touches the outside of the pipe 107. Because the IMS tool assembly 100 facilitates cooling water flowing through the pipe as the tungsten head 110 emits the material 105 through the round extrusion head 107, melting of carbon steel can be avoided while molten coating metal 105 touches the carbon steel.

Referring now to FIG. 1B, FIG. 1B exemplarily depicts the IMS tool assembly 100 coating an inside of the carbon steel pipe 101. The IMS tool assembly uses the same tungsten head 110 as described above in FIG. 1A for coating the outside of the pipe. As shown in FIG. 1B, the tungsten head 110 is pushed through the inside of the pipe and a round extrusion head 107 attached to the tungsten head coats the inside of the pipe. Simultaneously with the tungsten head being drawn through the pipe, a chiller 120 is provided to have water flowing on an outside of the pipe such that melting of carbon steel can be avoided while molten coating metal touches carbon steel. For applying the coating to the inside of the pipe, the tungsten head 110 is required to have an outer diameter plus a clearance size less than the interior diameter of the pipe. However, the tungsten head 110 can be reused for both the operation of applying the coating to the inside and the outside.

In one embodiment, the tungsten head 110 can be incorporated into a piston that pushes a rod into the seamless pipe to form the seamless pipe ("Mannesmann process"), so that seamless pipe formation and inner coating of the pipe with a higher grade steel composition can be done in a single step.

Thus, the IMS tool assembly 100 described in FIGS. 1A-1B can provide for a specially designed injection-molded solder (IMS) tool that can provide a layer of liquid metal to the inner surface or the outer surface of a steel pipe. During the application process or after subsequent annealing the new surface layer will form an intimate connection such as a metallic compound with the surface of the original pipe so that the new surface has either a desired nano-structure or passivation properties. This allows pipe manufactures to use expensive metals only where it would be needed thus reducing the cost of specialty pipes significantly (e.g., the carbon steel pipe 101 is used instead of the entire pipe being stainless steel thereby saving cost).

With reference now to FIG. 2, FIG. 2 exemplary depicts a method for applying a coating to an inside or outside of a pipe using the IMS tool assembly 200.

In step 201, cooling water flows either through an inside of the pipe (e.g., as shown in FIG. 1A) or along the outside of the pipe (e.g., as shown in FIG. 1B) according to if the inside or outside of the pipe is being coated.

In step 202, an outside of the pipe is coated with a molten coating by moving the tungsten head including a molten material along (e.g., over/around for an outer coating) a length of the pipe while the molten material is dispensed from the tungsten head into a round extrusion part for applying the molten material uniformly to an outside of the pipe (e.g., as shown in FIG. 1A)

In step 203, an inside of the pipe is coated with a molten coating by pushing (pulling) the tungsten head including a molten material through an inside of the pipe while the molten material is dispensed from the tungsten head into a round extrusion part for applying the molten material uniformly to the inside of the pipe.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. An injection-molded solder (IMS) tool assembly apparatus, the apparatus comprising:
    an IMS tool including a round extrusion part that has an outlet to dispense a molten material to coat an outside wall of a pipe; and
    a chiller comprising an opening that connects to the pipe and dispenses cooling water to flow through an inside of the pipe,
    wherein the IMS tool comprises:
        a tungsten head that dispenses the molten material into the round extrusion part;
        a heater that maintains a molten state of the molten material in the tungsten head; and
        a pressure source that supplies pressure to the molten material thereby causing the molten material to dispense from the tungsten head into the round extrusion part,
    wherein the IMS tool interfaces with a tungsten box and wherein the pipe is drawn through the tungsten box.

2. The injection-molded solder (IMS) tool assembly apparatus of claim 1, wherein an inner diameter of the round extrusion part is greater than an outer diameter of the pipe.

3. The injection-molded solder (IMS) tool assembly apparatus of claim 1, wherein the pipe comprises a carbon steel pipe.

4. The injection molded solder (IMS) tool assembly apparatus of claim 1, wherein a temperature of the cooling water is set such that the pipe is cooled to avoid melting of a material of the pipe while the molten material touches the outside wall of the pipe.

5. The injection-molded solder (IMS) tool assembly apparatus of claim 1, wherein a melting temperature of the molten material is greater than a melting temperature of the pipe.

6. The injection-molded solder (IMS) tool assembly apparatus of claim 3, wherein the molten material includes a material to coat the pipe such that the pipe has a stainless steel property.

7. The injection-molded solder (IMS) tool assembly apparatus of claim 1, wherein a melting temperature of the molten material is less than a melting temperature of the pipe.

8. The injection-molded solder (IMS) tool assembly apparatus of claim 6, wherein the molten material is selected from a group consisting of:
- a steel coating including Cr;
- a steel coating including Mo;
- a steel coating including Nb; and
- a steel coating including Ti.

9. The injection-molded solder (IMS) tool assembly apparatus of claim 3, wherein the molten material includes a material to coat the pipe such that the pipe has a stainless steel property.

10. An injection-molded solder (IMS) tool assembly apparatus, the apparatus comprising:
- an IMS tool including a round extrusion part that has an outlet to dispense a molten material to coat an inside wall of a pipe; and
- a chiller con an opening that provides cooling water to flow through an outside of the pipe,
- wherein the IMS tool comprises:
  - a tungsten head that dispenses the molten material into the round extrusion part, wherein the tungsten head is incorporated into a piston that pushes a rod into the pipe;
  - a heater that maintains a molten state of the molten material in the tungsten head; and
  - a pressure source that supplies pressure to the molten material thereby causing the molten material to dispense from the tungsten head into the round extrusion part.

11. The injection-molded solder (IMS) tool assembly apparatus of claim 10, wherein an outer diameter of the round extrusion part is less than an inner diameter of the pipe.

12. The injection-molded solder (IMS) tool assembly apparatus of claim 11, wherein the pipe comprises a carbon steel pipe.

13. The injection-molded solder (IMS) tool assembly apparatus of claim 11, wherein a temperature of the cooling water is set such that the pipe is cooled to avoid melting of a material of the pipe while the molten material touches the inside wall of the pipe.

14. The injection-molded solder (IMS) tool assembly apparatus of claim 10, wherein a melting temperature of the molten material is greater than a melting temperature of the pipe.

15. The injection-molded solder (IMS) tool assembly apparatus of claim 10,
- wherein the IMS tool dispenses the molten material via the round extrusion part to coat an outside wall of a pipe, and
- wherein the chiller provides cooling water to flow around an outside of the pipe.

16. The injection-molded solder (IMS) tool assembly apparatus of claim 1, wherein the round extrusion part fits over the outside wall of the pipe.

\* \* \* \* \*